United States Patent

[11] 3,581,828

[72] Inventor Gerald E. Thune
 Rte. 2, Sacred Heart, Minn. 56285
[21] Appl. No. 862,359
[22] Filed Sept. 30, 1969
[45] Patented June 1, 1971

[54] STABILIZER FOR TRACTOR TOOL BAR
 3 Claims, 3 Drawing Figs.
[52] U.S. Cl. .................................... 172/450,
 172/669, 280/150
[51] Int. Cl. .................................... A01b 59/042,
 A01b 63/116
[50] Field of Search ........................................ 172/190,
 395, 671, 450, 669, 673, 672; 280/150, 43.1,
 47.13, 47.16

[56] References Cited
 UNITED STATES PATENTS
3,024,850 3/1962 Morkoski ................... 172/450
3,047,076 7/1962 Wier et al. ................... 172/450

Primary Examiner—Robert E. Pulfrey
Assistant Examiner—C. W. Hanor
Attorney—Carlsen, Carlsen, Sturm & Wicks ABSTRACT: A stabilizer for a tool bar hitched in draft relation to a tractor comprising a support mounted on the tool bar and extending forwardly therefrom alongside a rear wheel tire of the tractor, and a rotary element journaled for rotation on the forward end of the support to bear against and roll along side of the tractor tire to prevent lateral movement of the tool bar.

Tool bars carrying ground breaking, planter implements or the like are generally mounted at the rear end of a two or three point hitch carried by a draft tractor. Such hitches are pivoted at their forward ends to the tractor on horizontal axes for raising and lowering movement of the tool bar. So mounted the tool bar is subject to a certain amount of lateral play. This is not particularly significant when the tractor and implement are travelling over level ground. However, on sidehill terrain the implement will tend to drift to the downhill side. This can be partially prevented by mounting a colter-type wheel on the tool bar for penetrating rolling engagement with the ground. However, it is found that such a wheel or wheels will tend to depart from a straight path behind the tractive vehicle in sidehill travel due to the laterally sliding implement weight making it difficult to carry the tool bar and its attached implements in straight parallel rows.

PATENTED JUN 1 1971 3,581,828
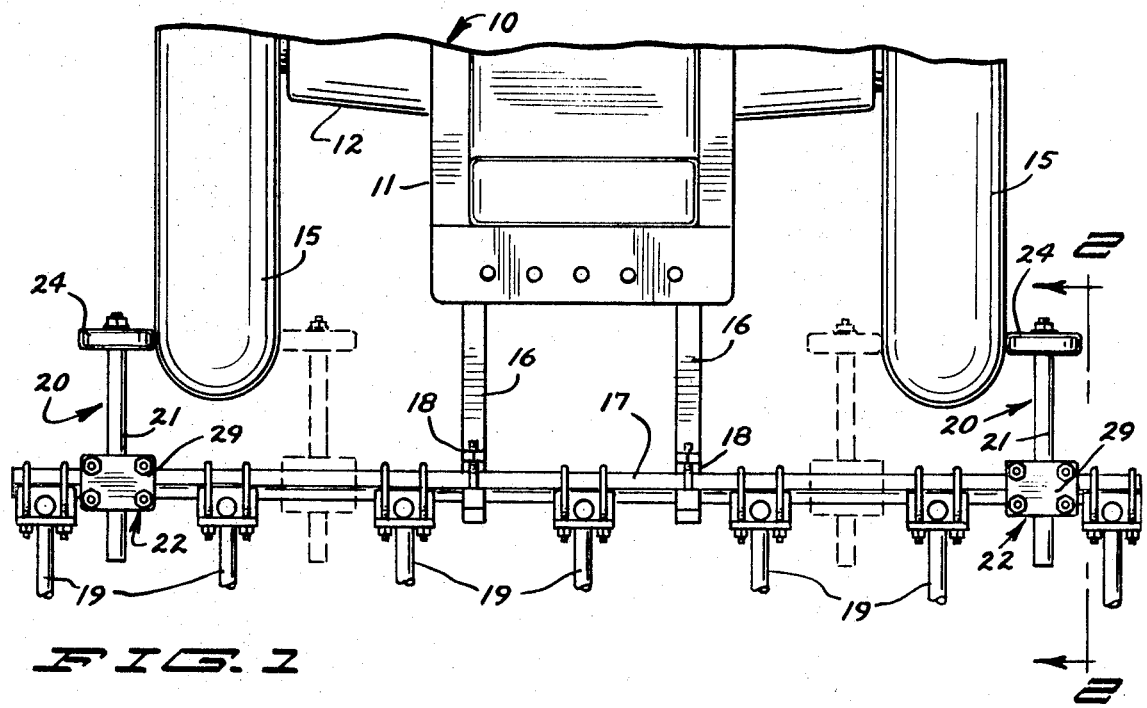
FIG. 1
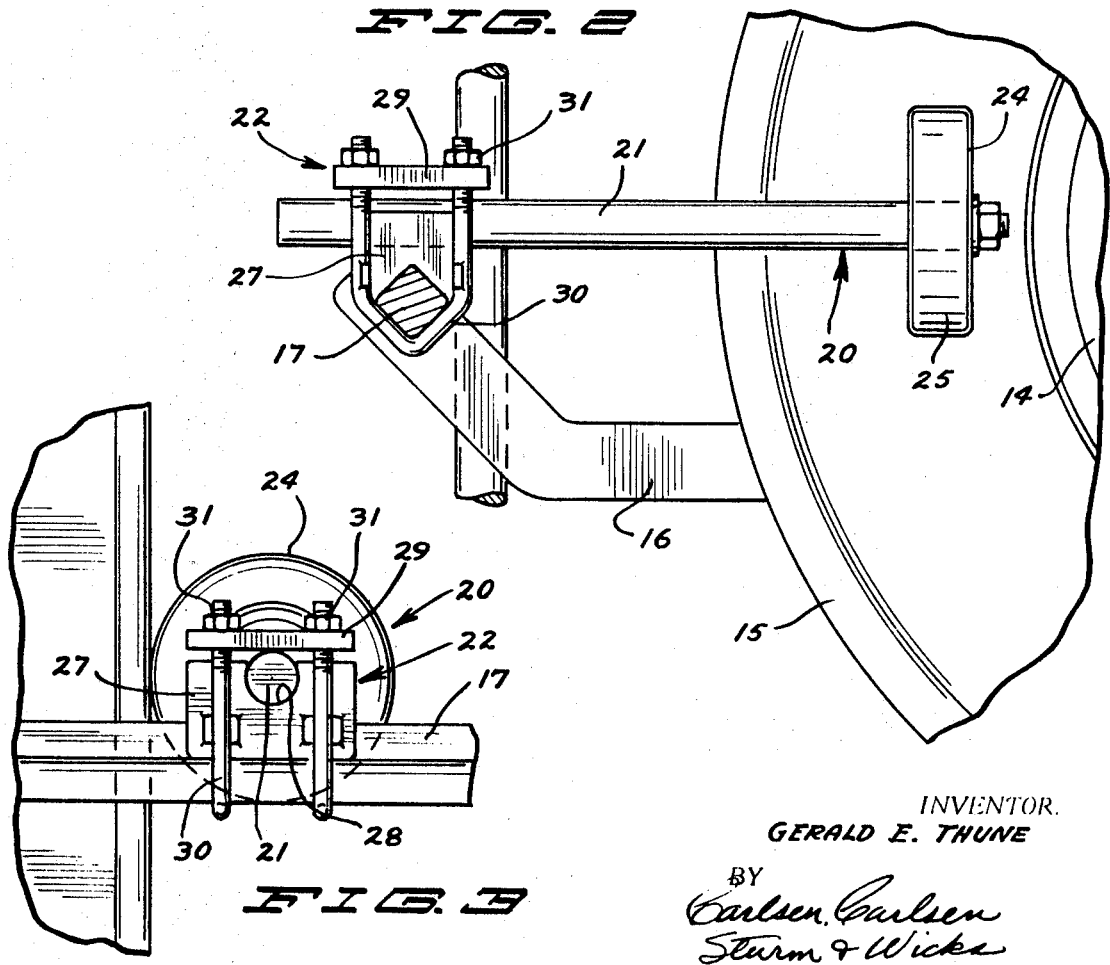
FIG. 2
FIG. 3
INVENTOR.
GERALD E. THUNE
BY
Carlsen, Carlsen
Sturm & Wicks
ATTORNEYS

STABILIZER FOR TRACTOR TOOL BAR

Others have proposed various devices for transversely interconnecting the draft links in the hitch. However, these are subjected to substantial stresses and strains particularly where the implement is carrying ground penetrating tools with the result that bending and breakage occurs. Also when a hitch is subjected to such pressures it is more difficult to raise and lower the links about their forward pivotal connections with the tractor.

Still another has provided a roller means on the hitch links for engagement with vertical surfaces on bumper members mounted in fixed positions on the tractor chassis. Such a structure is disclosed in U.S. Pat. No. 3,047,076, dated July 31, 1962 and issued to Wier et al. Here again the strain imposed upon the hitch links presents a problem and the roller means are disposed so far forward of the tool bar that any spacing between the roller and its engaged surface caused by wear, deflection or improper adjustment is multiplied many times at the trailing tool bar allowing a significant amount of undesirable lateral sway.

The object of the present invention is to provide an effective means for restricting lateral movement of a tractor drawn implement tool bar.

With this object in mind the invention broadly comprises mounting means on the tool bar adapted for rolling engagement with the sides of the tractor wheels or tires mounted thereon.

The above-mentioned and additional objects of the invention will be brought to light during the course of the following specification reference being made to the accompanying drawings in which:

FIG. 1 is a plan view of the rear end portion of a tractor having tool bar hitched in draft relation thereto and showing a pair of the stabilizer devices mounted on the bar with an alternate position shown in broken lines.

FIG. 2 is an enlarged fragmentary side elevation of the device showing its mounted position relative to the tool bar and rear tractor wheel and taken on line 2–2 of FIG. 1.

FIG. 3 is a rear elevation of the device.

Referring now more particularly to the drawing reference numerals will be used to denote like parts or structural features in the different views. A conventional tractor is denoted at 10 having a chassis 11 supported on a rear axle housing 12 and rear wheels 14 each of which carries a pneumatic tire 15. A pair of hitch links 16 having their forward ends pivotally connected on a transverse axis to chassis 11 jointly carry an implement tool bar 17 at their rear ends mounted thereon as by connecting brackets 18. The tool bar 17 carries a plurality of ground breaking implements spaced therealong such as spring tooth harrow members 19.

This is conventional tool bar mounting and it will be understood that as the members 19 move through the ground particularly in sidehill travel the bar 17 may tend to shift toward one side or the other.

A pair of the stabilizing devices each denoted generally at 20 are shown mounted on the tool bar 17. These devices are identical in construction. Each has an elongated support 21 mounted on the bar 17 by a bracket means 22 to extend forwardly therefrom on a horizontal plane alongside the rear portion of one of the tires 15. A rotary element 24 is journaled for rotation at the front end of support 21. Element 24 is preferably provided with a peripheral friction surface 25 of rubber or the like which may be in the form of a small rubber tire and this surface engages against the side of the tire 15. The bracket means 22, best shown in FIGS. 2 and 3, includes a mounting block 27 which sets upon the tool bar 17 and having an upwardly opening V-shaped groove 28 on its top side for seating the support 21. A plate 29 rests against the top of support 21 and is held firmly thereagainst by a pair of V-shaped end threaded bolts 30, one on each side of support 21, extending around bar 17 and block 27 and through plate 29 and being secured by nuts 31.

The stabilizing devices 20 are preferably mounted, as shown in FIG. 1, so that the rotary elements engage against the outer sides of the two rear tractor tires 15. However, they may also be mounted to engage against the inner sides of the tires as shown in broken lines. Either way they will prohibit any significant lateral movement of the draft bar 17 with the rotary element at the side of a tire opposite that of the direction to which the bar 17 is tending to move bearing against and rolling along the side of the tire which it engages.

It will be understood that the supports 21 can be adjusted longitudinally in the bracket means 22 so as to position the rotary elements 24 at the desired tire or wheel engaging positions.

Having now therefore fully illustrated and described my invention what I claim to be new and desire to protect by United States Letters Patent is:

1. A device for limiting lateral movement of a tool bar hitched in draft relation to a tractor vehicle to extend crosswise behind the rear wheels of the tractor which comprises:
    a. a pair of elongated supports,
    b. bracket means for fixedly mounting the supports on the tool bar in spaced relation therealong each along side and on opposite sides of a rear portion of one of said rear wheels, and
    c. a pair of rotary elements journaled one on the front end of each support on an axis parallel thereto to peripherally engage and roll along the adjacent side of said rear wheel to prohibit lateral movement of the tool bar in either direction.

2. The subject matter of claim 1 wherein said supports are spaced along the tool bar to extend one alongside each rear tractor wheel.

3. The subject matter of claim 1 wherein the rear wheels of the tractor are provided with pneumatic tires of resilient material and said rotary elements have the peripheral surfaces thereof formed of friction material for frictional rolling engagement against the side of the tire engaged thereby.